(12) United States Patent
Nakahara

(10) Patent No.: US 11,741,348 B2
(45) Date of Patent: Aug. 29, 2023

(54) NEURAL NETWORK CIRCUIT DEVICE, NEURAL NETWORK, NEURAL NETWORK PROCESSING METHOD, AND NEURAL NETWORK EXECUTION PROGRAM

(71) Applicant: Tokyo Institute of Technology, Tokyo (JP)

(72) Inventor: Hiroki Nakahara, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 479 days.

(21) Appl. No.: 16/648,319

(22) PCT Filed: Sep. 18, 2018

(86) PCT No.: PCT/JP2018/034522
§ 371 (c)(1),
(2) Date: Mar. 18, 2020

(87) PCT Pub. No.: WO2019/059191
PCT Pub. Date: Mar. 28, 2019

(65) Prior Publication Data
US 2020/0218964 A1    Jul. 9, 2020

(30) Foreign Application Priority Data
Sep. 20, 2017  (JP) ................................ 2017-180457

(51) Int. Cl.
*G06N 10/40* (2022.01)
*G06N 10/20* (2022.01)
(Continued)

(52) U.S. Cl.
CPC .................... *G06N 3/063* (2013.01)

(58) Field of Classification Search
USPC ...................... 706/15, 25, 45, 1, 6
See application file for complete search history.

(56) References Cited

U.S. PATENT DOCUMENTS

2017/0351948 A1* 12/2017 Lee .................... G06N 3/084
2018/0121802 A1*  5/2018 Ruckauer ............ G06N 3/049

FOREIGN PATENT DOCUMENTS

JP   2016-173843    9/2016
WO  WO 2018-101275   6/2018

OTHER PUBLICATIONS

Nakahara, Hiroki et al., "GUINNESS: A GUI based Binarized Deep Neural Network Framework for an FPGA", IEICE technical report, Sep. 18, 2017, vol. 117, No. 221, pp. 51-58.

(Continued)

*Primary Examiner* — Daquan Zhao
(74) *Attorney, Agent, or Firm* — CRGO Global; Steven M. Greenberg

(57) ABSTRACT

Provided are a neural network circuit device, a neural network, a neural network processing method, and a neural network execution program, each of which does not require a bias. A binarized neural network circuit includes: an input part configured to allow input of an input node which allows input of input values x1-xn (xi) (binary), and input of weights w1-wn (wi) (binary); an XNOR gate circuit configured to receive the input values x1-xn and the weights w1-wn and to take XNOR logic; a sum circuit configured to sum XNOR logical values; a batch normalization circuit configured to correct a variance due to binarization, by extending a range of normalization and shifting a center thereof; and an activating function circuit configured to convert a signal B obtained by batch-normalizing a signal Y generated by taking the sum, by means of an activating function f sgn(B).

14 Claims, 11 Drawing Sheets

(51) Int. Cl.
*G06N 10/70* (2022.01)
*G06N 3/063* (2023.01)
*G06N 10/00* (2022.01)
*G06N 20/20* (2019.01)

(56) References Cited

OTHER PUBLICATIONS

Nurvitadhi, et al., "Accelerating Binarized Neural Networks: Comparison of FPGA, CPU, GPU, and ASIC," Proc. 2016 Int. Conf. on FPT, Xian, China, Dec. 2016.
Hiroki Nakahara, et al., "A Memory-Based Realization of a Binarized Deep Convolutional Neural Network," Proc. of 2016 Int. Conf. on FPT, Xian, China, Dec. 2016.
Mohammad Rastegari, et al., "XNOR-Net: ImageNet Classification Using Binary Convolutional Neural Networks," Computer Vision and Pattern recognition, Mar. 2016.
Courbariaux, et al., "Binarized neural networks: Training deep neural networks with weights and activations constrained to +1 or −1," Computer Research Repository, Mar. 2016.

* cited by examiner

Without batch normalization
(with bias term)

With batch normalization
(with bias term)

With batch normalization
(without bias term)

FIG. 11

| Implementation (Year) | Zhao et al. (2017) | FINN (2017) | This embodiment |
|---|---|---|---|
| FPGA Board (FPGA) | Zedboard (XC7Z020) | PYNQ board (XC7Z020) | Zedboard (XC7Z020) |
| Clock (MHz) | 143 | 166 | 143 |
| # LUTs | 46900 | 42823 | 14509 |
| # 18Kb BRAMs | 94 | 270 | 32 |
| # DSP Blocks | 3 | 32 | 1 |
| Test Error | 12.27% | 19.9% | 18.2% |
| Time [msec] (FPS) | 5.94 (168) | 2.24 (445) | 2.37 (420) |
| Power [W] | 4.7 | 2.5 | 2.3 |
| FPS/Watt | 35.7 | 178.0 | 182.6 |
| FPS/LUT | $35.8 \times 10^{-4}$ | $103.9 \times 10^{-4}$ | $289.4 \times 10^{-4}$ |
| FPS/BRAM | 1.8 | 1.6 | 13.1 |

[Zhao et al.] R. Zhao, W. Song, W. Zhang, T. Xing, J.-H. Lin, M. Srivastava, R. Gupta and Z. Zhang, "Accelerating Binarized Convolutional Neural Networks with Software-Programmable FPGAs," ISFPGA, 2017, pp.15-24.

[FINN] Y. Umuroglu, N. J. Fraser, G. Gambardella, M. Blott, P. Leong, M.Jahre, and K. Vissers, "FINN: A Framework for Fast, Scalable Binarized Neural Network Inference," ISFPGA, 2017.

FIG. 13

|  | Fixed point (16-bit) | This embodiment binarization (batch normalization + without bias) | Binarization (bias only) |
|---|---|---|---|
| Number of FFs | 15,664 | 7,374 | 7,046 |
| Number of LUTs | 14,731 | 11,300 | 10,952 |
| Number of 18Kb BRAMs | 563 | 154 | 153 |
| Number of DSPs 48E | 52 | 30 | 26 |

NEURAL NETWORK CIRCUIT DEVICE, NEURAL NETWORK, NEURAL NETWORK PROCESSING METHOD, AND NEURAL NETWORK EXECUTION PROGRAM

CROSS-REFERENCE TO RELATED APPLICATIONS

This application is a § 371 national phase entry of International Application No. PCT/JP2018/034522, filed Sep. 18, 2018, which claims priority to Japanese Patent Application No. 2017-180457, filed Sep. 20, 2017.

TECHNICAL FIELD

The present invention relates to a neural network circuit device, a neural network, a neural network processing method, and a neural network execution program.

BACKGROUND ART

Some examples of a conventional feedforward neural network (FFNN) are a RBF (Radial Basis Function) network, a normalized RBF network, and a self-organizing map. The RBF network uses a radial basis function as an activating function used for backpropagation. The RBF network has, however, such problems that: a large number of intermediate layers are not available and it is difficult to determine recognition with high accuracy; and that a scale of hardware becomes large and a processing takes a long time. The RBF network has been thus applied to limited fields such as handwriting recognition.

In recent years, a convolutional neural network (CNN) (a network which is not fully connected between one layer and another) and a recurrent neural network (bidirectional propagation) have been presented which become focus of attention as new techniques in areas of image recognition for ADAS (advanced driver assistance system), automatic translation, and the like. The CNN is composed of a deep neural network (DNN) to which a convolution operation is added.

Patent Document 1 describes a processing part which solves a problem using an input signal and a value of a weight which is obtained by learning between loosely coupled nodes in a hierarchical neural network, based on a check matrix of error correction codes.

An existing CNN is constituted of a multiply-accumulate operation circuit with short accuracy (multibit) and requires a great number of multiplier circuits. This disadvantageously requires a large area and much power consumption. In view of the described above, a binarized accuracy, that is, a circuit in which the CNN is composed of only +1 and −1 (or only 0 and 1) has been proposed (see, for example, Non-Patent Documents 1 to 4 below).

In the techniques disclosed in Non-Patent Documents 1 to 4, however, reduction in accuracy into binary disadvantageously lowers recognition accuracy of the CNN. In order to avoid this and maintain accuracy of the binarized CNN, a batch normalization circuit becomes necessary.

RELATED ART DOCUMENTS

Patent Document

Patent Document 1: Japanese Laid-Open Patent Application, Publication No. 2016-173843

Non-Patent Documents

Non-Patent Document 1: M. Courbariaux, I. Hubara, D. Soudry, R. E. Yaniv, Y. Bengio, "Binarized neural networks: Training deep neural networks with weights and activations constrained to +1 or −1," Computer Research Repository (CoRR), "Binary Neural Network Algorithm", [online], March 2016, [searched on Oct. 5, 2016], <URL: http://arxiv.org/pdf/1602.02830v3.pdf>

Non-Patent Document 2: Mohammad Rastegari, Vicente Ordonez, Joseph Redmon, Ali Farhadi, "XNOR-Net: ImageNet Classification Using Binary Convolutional Neural Networks," Computer Vision and Pattern recognition, "Binary Neural Network Algorithm", [online], March 2016, [searched on Oct. 5, 2016], <URL: https://arxiv.org/pdf/1603-05279v4>

Non-Patent Document 3: Hiroki Nakahara, Haruyoshi Yonekawa, Tsutomu Sasao, Hisashi Iwamoto and Masato Motomura, "A Memory-Based Realization of a Binarized Deep Convolutional Neural Network," Proc. of the 2016 International Conference on Field-Programmable Technology (FPT), Xi'an, China, December 2016 (To Appear).

Non-Patent Document 4: Eriko Nurvitadhi, David Sheffield, Jaewoong Sim, Asit Mishra, Ganesh Venkatesh, Debbie Marr, "Accelerating Binarized Neural Networks: Comparison of FPGA, CPU, GPU, and ASIC," Proc. of the 2016 International Conference on Field-Programmable Technology (FPT), Xi'an, China, December 2016 (To Appear).

SUMMARY OF THE INVENTION

Problem to be Solved by the Invention

In a CNN, along with progress of learning, weights are distributed more evenly. Distribution of the weights is not, however, completely even, because there is variance in training data. This requires a correction for adjustment using a bias. Accuracy of the bias is as many as 30 to 40 bits in terms of a fixed point accuracy, though depending on training data. This makes it necessary to provide an additional circuit such as an adder, even if a floating point accuracy is used. There has been thus a problem that an area or power consumption is disadvantageously increased.

The present invention has been made in light of the background described above and in an attempt to provide a neural network circuit device, a neural network, a neural network processing method, and a neural network execution program, each of which does not require a bias.

Means for Solving the Problems

A neural network circuit device of the present invention including at least an input layer, one or more intermediate layers, and an output layer, the neural network circuit device includes: a logic circuit part configured to receive, in the one or more intermediate layers, a binary input value xi and a weight wi and perform a logical operation; a sum circuit part configured to receive a sum of output results of the logic circuit part; a batch normalization circuit part configured to correct a variance due to binarization, by performing a processing of extending a normalization range and shifting a center of the range; and an activation circuit part configured to convert a signal B obtained by batch-normalizing a signal Y generated by taking the sum by means of an activating function f sgn(B). The signal Y generated by taking the sum is expressed by the following formula:

[Formula 6]

$$Y = \sum_{i=1}^{n} w_i x_i + \left(\mu'_B + \frac{\sqrt{\sigma_B^2 + \epsilon}}{\gamma}\beta\right) \quad (6)$$

where
γ: a scaling coefficient
β: a shift value
$\mu'_B$: an average value excluding a bias; if a bias value when an input value is x0 is denoted by w0, and an average value of minibatches is denoted by $\mu_B$, then "w0−$\mu_B$".
$\sigma^2_B$: a variance value of minibatches
ε: a constant
Other means will be described in embodiments for carrying out the invention.

Advantageous Effects of the Invention

The present invention can provide a neural network circuit device, a neural network, a neural network processing method, and a neural network execution program, each of which does not require a bias.

BRIEF DESCRIPTION OF THE DRAWINGS

FIG. 11 is a table showing comparative results between the binarized neural network circuit of the deep neural network according to the embodiment and an existing binarized neural network circuit.

FIG. 13 is a diagram illustrating amounts of hardware in different FPGA implementations for comparison.

EMBODIMENTS FOR CARRYING OUT THE INVENTION

A deep neural network according to an embodiment for carrying out the present invention (which may be simply referred to as "this embodiment" hereinafter) is described below with reference to related drawings.

Explanation of Background

Figure 1:
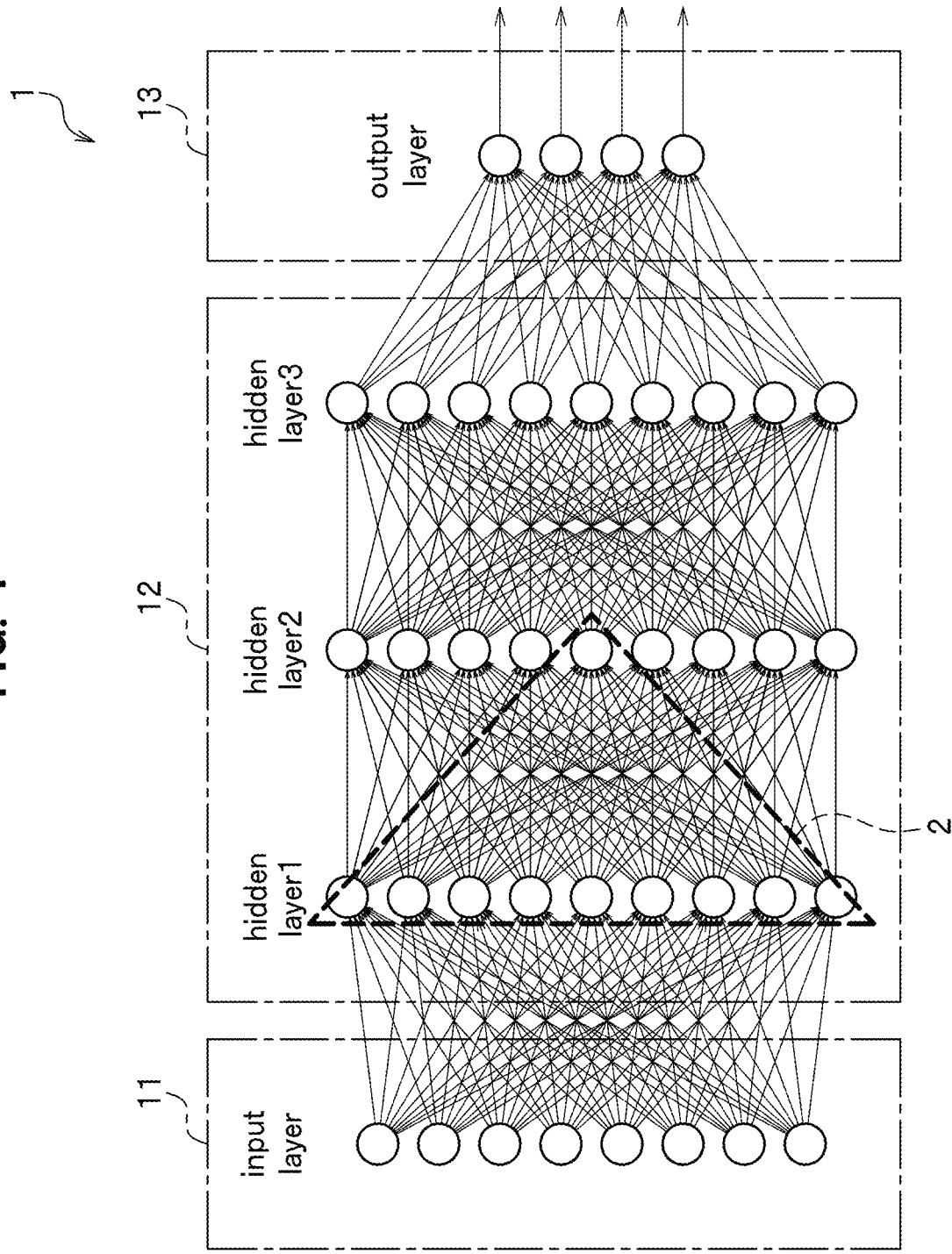
FIG. 1 is a diagram explaining an example of a structure of a deep neural network (DNN).

FIG. 1 is a diagram explaining an example of a structure of a deep neural network (DNN).

As illustrated in FIG. 1, a deep neural network (DNN) 1 includes: an input layer 11; a hidden layer 12 that is an intermediate layer and is provided in any number; and an output layer 13.

The input layer 11 includes a plurality of (illustrated herein as eight) input nodes (neurons). The number of the hidden layers 12 is more than one (illustrated herein as three (hidden layer1, hidden layer2, and hidden layer3)). Actually, however, a layer number n of the hidden layers 12 is, for example, as many as 20 to 100. The output layer 13 includes output nodes (neurons) as many as the number of objects to be identified (illustrated herein as four). Note that each of the number of layers and the number of nodes (neurons) described above is given by way of example only.

In the deep neural network 1, each one of the input layers 11 is connected to each one of the hidden layers 12, and each one of the hidden layers 12 is connected to each one of the output layers 13.

Each of the input layer 11, the hidden layer 12, and the output layer 13 includes any number of nodes (see marks ○ in FIG. 1). The node is a function which receives an input and outputs a value. The input layer 11 also includes a bias node in which a value independent and separate from that of the input node is put. A structure herein is established by putting one of the layers each including a plurality of nodes, on top of another. In propagation, an input received: is weighted; is converted using an activating function (an activation function); and is outputted to the next layer. Some examples of the activating function are a non-linear function such as a sigmoid function and a tanh function, and a ReLU (Rectified Linear Unit function). An increase in the number of nodes makes it possible to increase the number of variables to be treated and to thereby determine a value/boundary, taking a large number of factors into consideration. An increase in the number of layers makes it possible to express a combination of linear boundaries, or a complicated boundary. In learning, an error is calculated, based on which a weight of each layer is adjusted. Learning means solving an optimization problem such that an error becomes minimized. In a method of solving the optimization problem, backpropagation is generally used. A sum of squared error is generally used as an error. A regularization term is added to an error so as to enhance generalization ability. In backpropagation, an error is propagated from the output layer 13, and a weight of each layer is thereby adjusted.

A CNN suitably used for image processing can be established by two-dimensionally developing a structure of the deep neural network 1 of FIG. 1. Additionally, by giving feedback to the deep neural network 1, a RNN (Recurrent Neural Network) can be constituted in which a signal is propagated bidirectionally.

As illustrated in a bold dashed triangle in FIG. 1, the deep neural network 1 is constituted by a circuit which achieves a multi-layer neural network (which will be referred to as a neural network circuit hereinafter) 2.

Techniques of the present invention are directed to the neural network circuit 2. How many neural network circuits 2 are applied to which position is not specifically limited. For example, when the layer number n of the hidden layers 12 is 20 to 30, the neural network circuit 2 may be applied to any position of any of the layers, and any node may serve as an input node or an output node. The neural network circuit 2 may be used not only in the deep neural network 1 but also in any other neural networks. In outputting a node in the input layer 11 or the output layer 13, however, the neural network circuit 2 is not used because not binary output but multibit output is required. Nevertheless, it does not cause a problem in terms of area, even if the multiplier circuit is left in a circuit constituting a node in the output layer 13.

Note that it is assumed herein that evaluation is performed to input data which has already been subjected to learning. This means that a weight wi is already obtained as a result of the learning.

Neural Network Circuit

Figure 2:
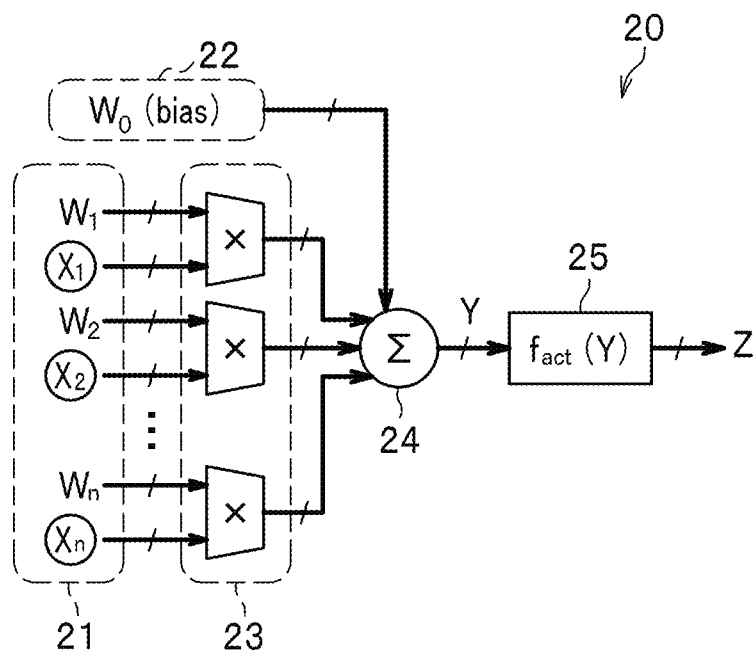
FIG. 2 is a diagram explaining an example of a structure of a neural network circuit in a neural network according to a comparative example.

FIG. 2 is a diagram illustrating an example of a structure of a deep neural network according to a comparative example.

A neural network circuit 20 according to the comparative example can be applied to the neural network circuit 2 constituting the deep neural network 1 of FIG. 1. Note that in each of the related drawings to be explained hereinafter, when a value is multibit, the value is indicated by a thick solid arrow and a bundle; and when a value is binary, the value is indicated by a thin solid arrow.

The neural network circuit 20 includes: an input part 21 configured to allow input of an input node which allows input of input values (identification data) X1-Xn (multibit), and weights W1-Wn (multibit); a bias W0 input part 22 configured to allow input of a bias W0 (multibit); a plurality of multiplier circuits 23 each of which is configured to allow input of the input values X1-Xn and the weights W1-Wn and to multiply each one of the input values X1-Xn and each one of the weights W1-Wn; a sum circuit 24 configured to sum each of the multiplied values and a bias W0; and an activating function circuit 25 configured to convert a signal Y generated by taking the sum, by means of the activating function f act(Y).

In the structure described above, the neural network circuit 20: receives the input values X1-Xn (multibit); multiplies the input values X1-Xn by the weights W1-Wn; and makes the signal Y having been summed inclusive of the bias W0 pass through the activating function circuit 25, to thereby realize a processing simulating that performed by a human neuron.

Figure 3:
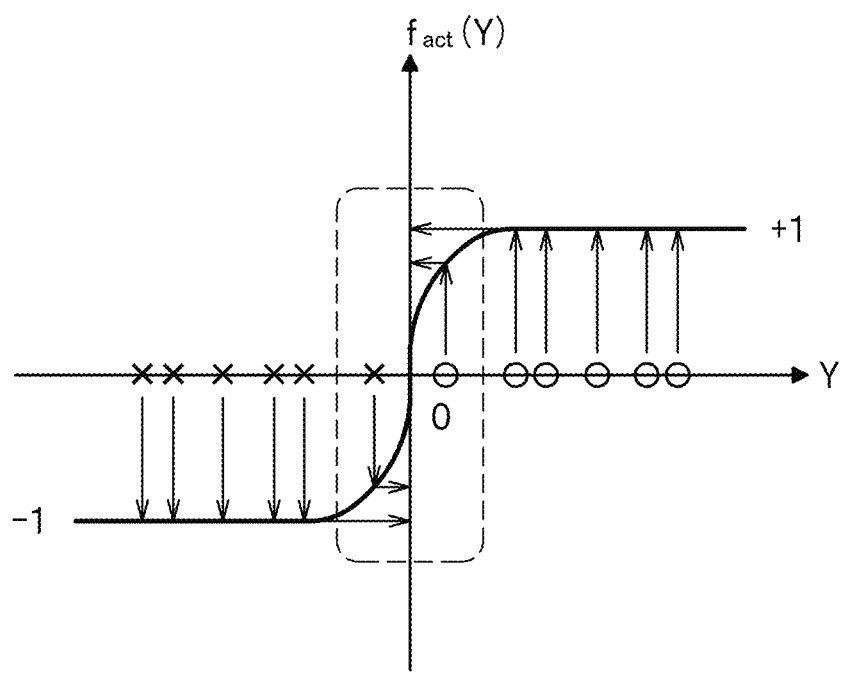
FIG. 3 is a diagram illustrating an activating function f act(Y) illustrated in the neural network circuit of FIG. 2.

FIG. 3 is a diagram illustrating the activating function f act(Y) shown in the neural network circuit of FIG. 2. In FIG. 3, the abscissa denotes a signal Y as a sum total, and the ordinate denotes a value of the activating function f act(Y). In FIG. 3, a mark ○ indicates a positive activation value (a state value) within a range of values of ±1; and a mark x, a negative activation value.

Figure 4:
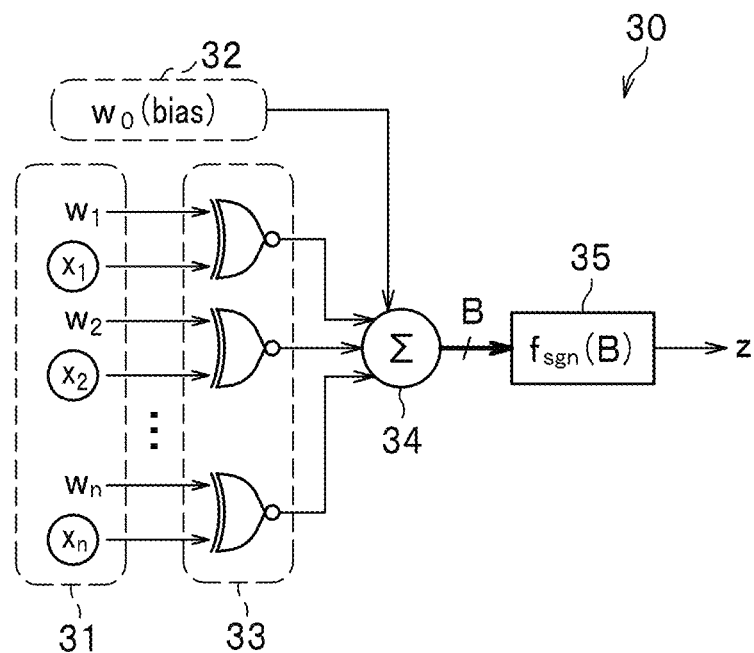
FIG. 4 is a diagram illustrating an example of a structure of a binarized neural network circuit in which, in place of a multiplier circuit in the neural network circuit illustrated in FIG. 2, an XNOR gate circuit is used.

The neural network circuit 20 (see FIG. 2) achieves high recognition accuracy with multiple bits. Thus, the non-linear activating function f act(Y) can be used in the activating function circuit 25 (see FIG. 2). That is, as illustrated in FIG. 4, the non-linear activating function f act(Y) can set an activation value that takes a value within a range of ±1, in an area in which a slope is nonzero (see a encircled portion encircled by dashed line of FIG. 4). The neural network circuit 20 can therefore realize activation of various types and make recognition accuracy thereof take a practical value. The neural network circuit 20 requires, however, a large number of the multiplier circuits 23. Additionally, the neural network circuit 20 requires a large capacity memory, because an input/output and a weight are multibit, and a reading and writing speed (a memory capacity and a bandwidth) is also a problem to be solved.

Binarized Neural Network Circuit with Simple Binarization

The neural network circuit 20 illustrated in the comparative example of FIG. 2 is composed of a multiply-accumulate operation circuit with short accuracy (multibit). This requires a large number of multiplier circuits 23, which disadvantageously results in a large area and much power consumption. Additionally, the neural network circuit 20 requires a large capacity memory, because each of an input/output and a weight is multibit, and a reading and writing speed (a memory capacity or a bandwidth) is also a problem to be solved.

In view of the described above, a circuit in which the neural network circuit 2 (see FIG. 1) is constituted with a binarized accuracy, that is, using only +1 and −1 has been proposed (Non-Patent Documents 1 to 4). More specifically, it is contemplated that the multiplier circuit 23 of the neural network circuit 20 illustrated in FIG. 2 is replaced by a logic gate (for example, an XNOR gate circuit).

FIG. 4 is a diagram illustrating an example of a structure of a binarized neural network circuit in which an XNOR gate circuit is used in place of the multiplier circuit 23 in the neural network circuit 20 illustrated in FIG. 2 as the comparative example.

A binarized neural network circuit 30 in the comparative example is applicable to the neural network circuit 2 of FIG. 1.

As illustrated in FIG. 4, the binarized neural network circuit 30 according to the comparative example includes: an input part 31 configured to allow input of an input node which allows input of input values x1-xn (binary), and weights w1-wn (binary); a bias w0 input part 32 configured to allow input of a bias W0 (binary); a plurality of XNOR gate circuits 33 each of which is configured to allow input of the input values x1-xn and the weights w1-wn and to take XNOR (Exclusive NOR) logic; a sum circuit 34 configured to sum XNOR logical values in the XNOR gate circuits 33 and the bias w0; and an activating function circuit 35 configured to convert a signal B obtained by batch-normalizing a signal Y generated by taking the sum, by means of the activating function f sgn(B).

The binarized neural network circuit 30 includes, in place of the multiplier circuit 23 (see FIG. 2), the XNOR gate circuit 33 which realizes the XNOR logic. This makes it possible to reduce an area which is otherwise required for structuring the multiplier circuit 23. Additionally, because all of the input values x1-xn, an output value z, and the weights w1-wn are binary (−1 or +1), an amount of memory can be significantly reduced, compared to being multivalued, and a memory bandwidth can be improved.

Figure 5:
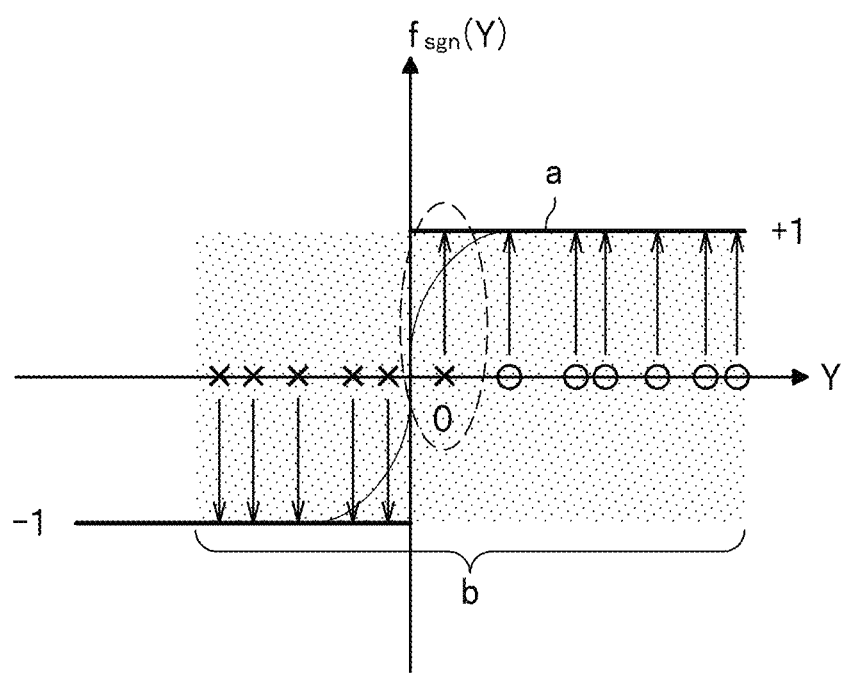
FIG. 5 is a diagram illustrating an activating function f sgn(B) in the binarized neural network circuit illustrated in FIG. 4.

FIG. 5 is a diagram illustrating an activating function f sgn(B) in the above-described binarized neural network circuit 30 illustrated in FIG. 4 as the comparative example. In FIG. 5, the abscissas denotes a signal Y generated by taking a sum, and the ordinate denotes a value of the activating function f sgn(B). In FIG. 5, a mark ○ represents a positive activation value within a range of values of ±1; and a mark x, a negative activation value.

In the binarized neural network circuit 30, the input values x1-xn and the weights w1-wn are simply binarized. Thus, as indicated by sign "a" in FIG. 5, what can be treated is only an activating function which treats only ±1. This may frequently cause errors. Additionally, an area in which a slope is nonzero (see a portion encircled by dashed line in FIG. 5) becomes uneven, and learning does not work well. That is, as indicated by sign "b" in FIG. 5, differential cannot be defined due to an uneven width of the area. As a result, recognition accuracy of the simply-binarized neural network circuit 30 is significantly decreased.

In light of the described above, Non-Patent Documents 1 to 4 disclose techniques of performing batch normalization so as to maintain accuracy of an existing binarized neural network.

Binarized Neural Network Circuit Having Batch Normalization Circuit

Figure 6:
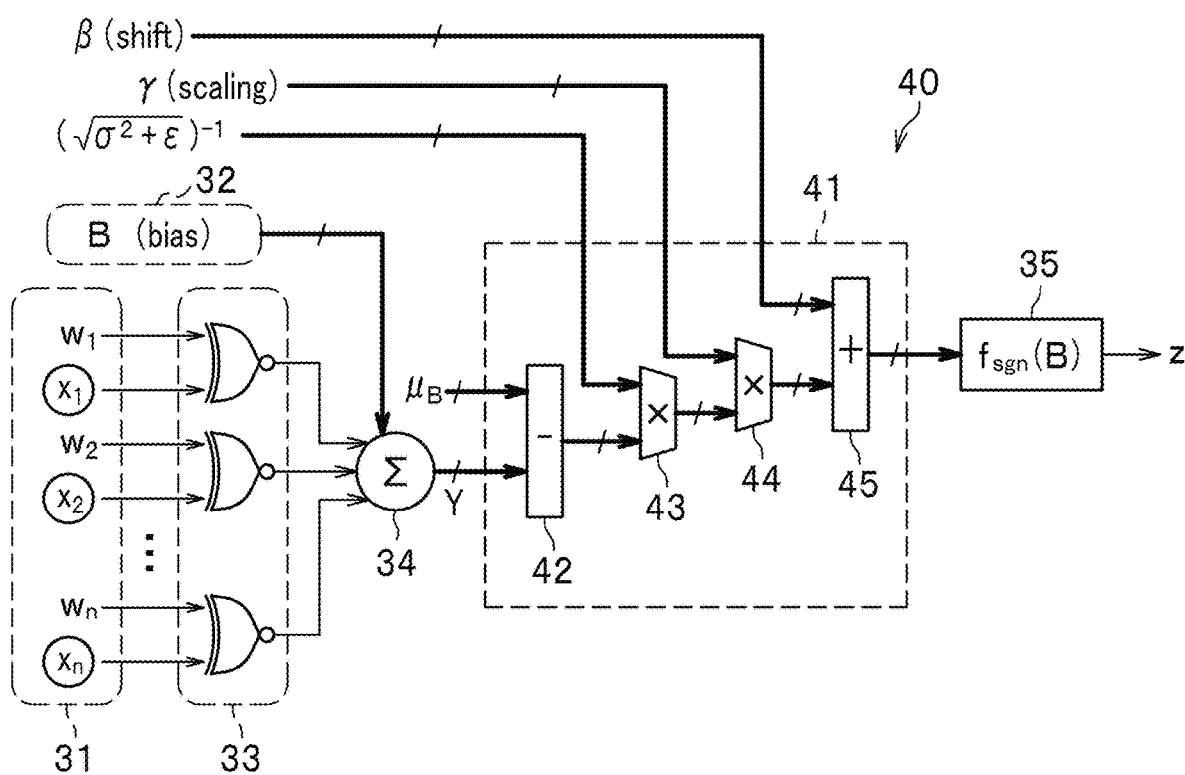
FIG. 6 is a diagram illustrating an example of a structure of a binarized neural network circuit having a batch normalization circuit according to another comparative example.

FIG. 6 is a diagram illustrating an example of a structure of a binarized neural network circuit 40 having a batch normalization circuit in which a binarized accuracy of the comparative example is corrected to maintain recognition accuracy of a CNN. In FIG. 6, same reference numerals are given to components same as those in FIG. 4.

As illustrated in FIG. 6, the binarized neural network circuit 40 according to another comparative example includes: the input nodes x1-xn configured to allow input of input values x1-xn (binary); the input part 31 configured to allow input of weights w1-wn (binary); a bias B input part 32 configured to allow input of a bias B (multibit); a plurality of the XNOR gate circuits 33 each of which is configured to receive the input values x1-xn and the weights w1-wn and to take a XNOR (Exclusive NOR) logic; the sum circuit 34 configured to sum XNOR logical values in the XNOR gate circuit 33 and the bias B; a batch normalization circuit 41 configured to correct a variance due to binarization, by performing a processing of extending a normalization range and shifting a center of the range; and the activating function circuit 35 configured to convert a signal B obtained by batch-normalizing a signal Y generated by taking the sum, by means of the activating function f sgn(B).

The batch normalization circuit 41 includes: a subtractor 42 configured to subtract a difference between the signal Y generated by using a weighted sum, and an average value ($\mu_B$); a first multiplier circuit 43 configured to multiply the outputted value obtained from the subtractor 42, by a reciprocal of a root of a sum of a variance value ($\sigma^2_B$) of a minibatch and a constant ($\epsilon$); a second multiplier circuit 44 configured to normalize the outputted value obtained from the first multiplier circuit 43, using a scaling ($\gamma$) value (multibit); and an adder 45 configured to, after the normalization using the scaling coefficient ($\gamma$), make a shift based on a shift value ($\beta$) (multibit) and then perform grouping into two. Respective parameters of the scaling coefficient ($\gamma$) and the shift value ($\beta$) are previously made ready when learning is performed.

If a weight is updated for each piece of training data, it takes much computation time and a result may be inconveniently affected by unusual data. Thus, a technique of updating data by the batch as a unit of a group of data is used. Data is herein updated by a minibatch which is a unit made by splitting a batch into smaller portions.

The binarized neural network circuit 40 having the batch normalization circuit 41 makes it possible to correct binarized accuracy and maintain recognition accuracy of a CNN.

Note that, not just limited to the XNOR gate, any logic gate may be used herein as long as the logic gate takes an XNOR logic of the input values x1-xn and the weights w1-wn. For example, such a logic gate may be used in which a sum is taken using an XOR circuit and a negation of an activating function is taken.

Reason Why Batch Normalization Circuit is Necessary

Next is described a reason why the batch normalization circuit 41 of the binarized neural network circuit 40 according to another comparative example is necessary.

Figure 7:
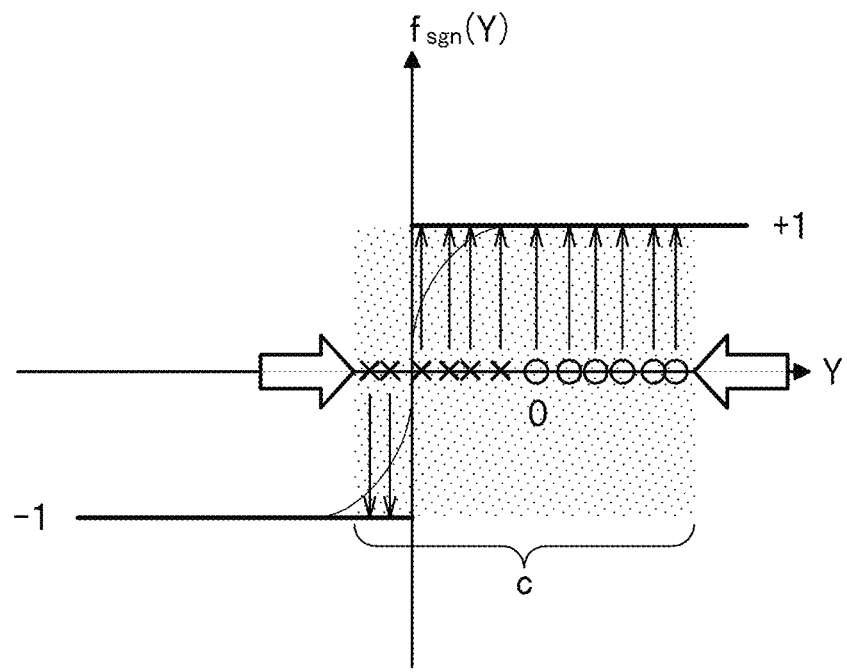
FIG. 7 is a diagram illustrating normalization of a binarized neural network circuit of a neural network, using a scaling (γ).
Figure 8:
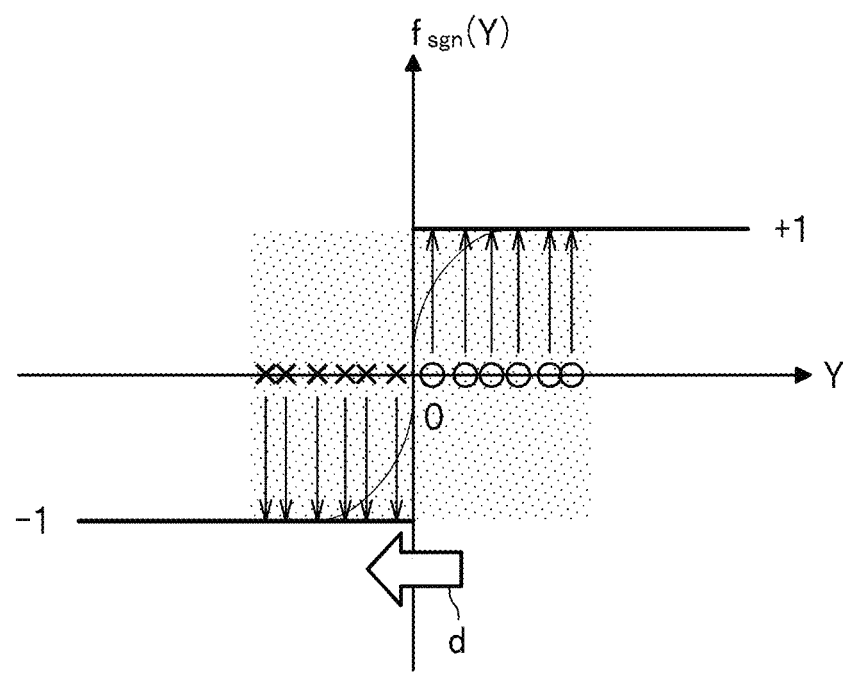
FIG. 8 is a diagram illustrating a limitation within a range from −1 to +1 of the binarized neural network circuit in the neural network, using a shift (β).

FIG. 7 and FIG. 8 are each a diagram explaining advantageous effects produced by batch normalization in the binarized neural network circuit 40 according to the comparative example. FIG. 7 is a diagram illustrating normalization using a scaling coefficient ($\gamma$) according to the comparative example. FIG. 8 is a diagram illustrating a limitation within a range from −1 to +1, using a shift value ($\beta$) according to the comparative example.

The batch normalization used herein: means a circuit for correcting a variance due to binarization; and, after summing the weight, and normalization using the scaling coefficient ($\gamma$) is achieved by performing grouping into two by means of appropriate activation based on the shift value ($\beta$). Those parameters are previously made ready when learning is performed. More specific explanation is given below.

As indicated by outlined arrows and a sign "c" of FIG. 7, the multiplier circuit 42 (see FIG. 6) of the batch normalization circuit 41 normalizes a (resultant) signal Y after summing the weights, into a width of "2" (see a shaded area in FIG. 7), using a scaling coefficient ($\gamma$). As will be understood compared to a width in FIG. 5 (see a shaded area in FIG. 5), the normalization into the width of "2" using the scaling coefficient ($\gamma$) can reduce unevenness of the width. This cannot be achieved in the simply binarized neural network circuit 30 because differential cannot be defined due to the uneven width.

Then, as indicated by an outlined arrow and a sign "d" in FIG. 8, the adder 45 (see FIG. 6) of the batch normalization circuit 41 constrains a value after normalization using the scaling coefficient ($\gamma$), to a range from −1 to +1 using the shift value ($\beta$). That is, as will be understood compared to the width in FIG. 5 (see the shaded portion of FIG. 5), when the width in FIG. 5 (see the shaded portion of FIG. 5) is shifted more on a +1 side, a value after the normalization using the scaling coefficient ($\gamma$) is limited from −1 to +1 using the shift value ($\beta$), to thereby set a center of the width to "0". In the example illustrated in FIG. 5, an activation value on the positive side (see a mark x in the portion encircled by dashed line of FIG. 5) is shifted back to the negative side on which the activation value should be situated originally. This can reduce generation of errors and enhance recognition accuracy.

As described above, the binarized neural network circuit 40 requires the batch normalization circuit 41.

Necessity For Correction Using Bias Term

As described above, along with progress of learning, weights are distributed more evenly. Distribution of the weights does not, however, become completely even, because there is variance in training data. This requires a correction for adjustment using a very small bias term. Accuracy of the bias term is as many as 30 to 40 bits in terms of a fixed point accuracy, though depending on training data. This makes it necessary to provide an additional circuit such as an adder, even if a floating point accuracy is used.

That is, variance in training data makes it highly difficult to obtain a completely even distribution, and a bias (or an operation equivalent thereto) is needed for adjusting the distribution. It is thus necessary for the bias to be multibit. Note that a value of the bias is ever changing depending on training data or learning period.

A neural network without using a bias does not work for practical use. In an example to be described in FIG. 10, for example, it is estimated that "Classification Error" is as high as about 90%.

A problem directly brought about by the presence of a bias is that a circuit with high accuracy becomes necessary. Such a high accuracy circuit requires a large area and much power consumption.

Principle of the Present Invention

What is particularly focused on in the present invention is the finding that, as a result of analytical computation of a network equivalent to that in which batch normalization operation is introduced, the obtained network requires no bias term.

In other words, let Y be a signal which is inputted in the batch normalization circuit 41 (see FIG. 6) in the binarized neural network circuit 40, after summing weights, and then, a signal outputted from the batch normalization circuit 41 (a signal equivalent to Y) Y' (an intermediate value) is represented by Formula (1) as follows.

[Formula 1]

$$Y' = \gamma \frac{Y - \mu_B}{\sqrt{\sigma_B^2 + \epsilon}} + \beta \qquad (1)$$

$$= \frac{\gamma}{\sqrt{\sigma_B^2 + \epsilon}} \left( Y - \left( \mu_B - \frac{\sqrt{\sigma_B^2 + \epsilon}}{\gamma} \beta \right) \right).$$

where
γ: a scaling coefficient
β: a shift value
$\mu_B$: an average value of minibatches
$\sigma_B$: a variance value of minibatches
ε: a constant (so as to avoid division by zero)

Each of the scaling coefficient (γ), the shift value (β), the average value of minibatches ($\mu_B$), the variance value of minibatches ($\sigma_B^2$), and the constant (ε) is a value obtained by batch normalization at learning time.

An output made to pass through an activating function in the binarized neural network circuit 40 is +1 or −1 (or 0 or 1 depending on allocation of signals). Further, given the coefficient "$\gamma/\sqrt{(\sigma_B^2+\epsilon)^{-1}}$" in Formula 1, a value made to pass through the activating function can be ignored because the value remains unchanged even after an intermediate signal in the binarized neural network circuit 40 is subject to conversion.

Therefore, Formula 1 is arranged into Formula (2) as follows.

[Formula 2]

$$Y' = \left( Y - \left( \mu_B - \frac{\sqrt{\sigma_B^2 + \epsilon}}{\gamma} \right) \right) \qquad (2)$$

A value obtained by the binarized activating function herein is +1 or −1 (or 0 or 1 depending on allocation of signals) according to whether the intermediate value Y' is positive or negative. Therefore, a value "$f'_{sgn}(Y)$" of the binarized activating function is determined depending on a condition in Formula (3) as follows.

[Formula 3]

$$f'_{sgn}(Y') = \begin{cases} 1 & \text{if } Y' < -\mu_B + \frac{\sqrt{\sigma_B^2 + \epsilon}}{\gamma} \\ -1 & \text{Other than the above} \end{cases} \qquad (3)$$

A weighted multiply-accumulate operation can be thus obtained from the analytical operations described above, as represented by Formula (4) as follows.

[Formula 4]

$$Y = \sum_{i=0}^{n} w_i x_i - \mu_B + \frac{\sqrt{\sigma_B^2 + \epsilon}}{\gamma} \beta \qquad (4)$$

Given the simply-binarized neural network circuit 20 (see FIG. 2), "input value"×0=1. Then, given that w0 is a bias value, Formula (4) is arranged into Formula (5) as follows.

[Formula 5]

$$Y = \sum_{i=1}^{n} w_i x_i + \left( w_0 - \mu_B + \frac{\sqrt{\sigma_B^2 + \epsilon}}{\gamma} \beta \right) \qquad (5)$$

Note that a sum operation of the first term of Formula (5) described above begins with i=1. That is, the first term of Formula (5) represents a neural network which does not include a bias value. In contrast, the first term of Formula (4) described above begins with i=0.

Introducing "$w0-\mu_B=\mu'_B$" to Formula (5), Formula (5) is arranged into Formula (6) as follows. Herein, $\mu'_B$ is an average value excluding a bias.

[Formula 6]

$$Y = \sum_{i=1}^{n} w_i x_i + \left( \mu'_B + \frac{\sqrt{\sigma_B^2 + \epsilon}}{\gamma} \beta \right) \quad (6)$$

Formula (6) described above implies the following: learning by using a neural network excluding a bias, and batch normalization can suitably realize a binarized neural network. This means that a circuit structure which realizes Formula (6) learns $\mu'_B$, that is, learns a value obtained by subtracting a bias value and an average value of minibatches which have been learned.

In a conventional neural network, learning converges at an intermediate layer, especially as the learning proceeds to a latter half stage. Convergence of the learning in the latter half stage makes dispersion of weights constant. There has been thus a problem that a bias value for adjustment becomes very small.

Formula (6) described above shows that even without learning of bias values separately, an equivalent binarized neural network can be learned. In order to obtain the finding, analytic observations described above are required.

Constitution of Embodiment

Figure 9:
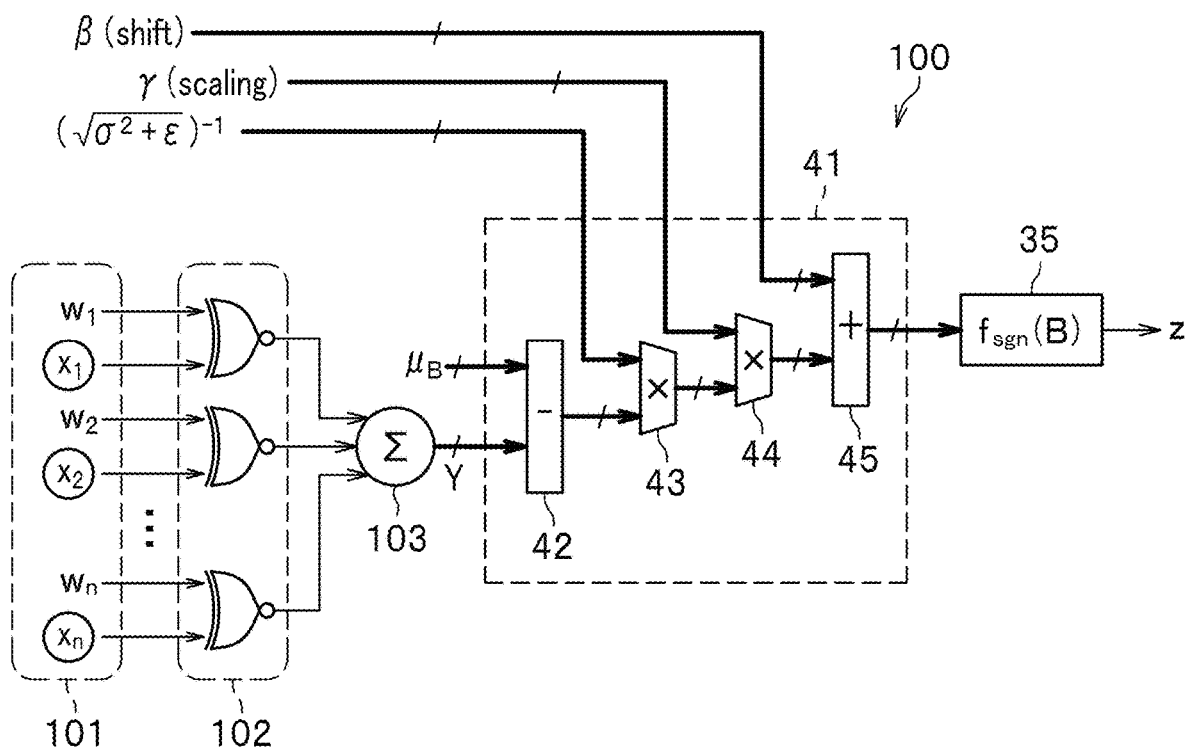
FIG. 9 is a diagram illustrating a structure of a binarized neural network circuit in a deep neural network according to an embodiment of the present invention.

FIG. 9 is a diagram illustrating a structure of a binarized neural network circuit of a neural network according to the embodiment of the present invention. In FIG. 9, same reference numerals are given to the components same as those illustrated in FIG. 6 as the comparative example.

The binarized neural network circuit according to the embodiment provides techniques of implementation in a deep neural network.

A binarized neural network circuit 100 can be applied to the neural network circuit 2 of FIG. 1.

The binarized neural network circuit 100 (which may also be referred to as a neural network circuit device) is a binarized neural network circuit which does not require a bias.

As illustrated in FIG. 9, the binarized neural network circuit 100 includes: an input part 101 configured to allow input of an input node which allows input of input values x1-xn (xi) (binary), and input of weights w1-wn (wi) (binary); an XNOR gate circuit 102 (a logic circuit part) configured to receive the input values x1-xn and the weights w1-wn and to take XNOR logic; a sum circuit 103 (a sum circuit part) configured to sum XNOR logical values; a batch normalization circuit 41 configured to correct a variance due to binarization, by extending a range of normalization and shifting a center thereof; and an activating function circuit 35 configured to convert a signal B obtained by batch-normalizing a signal Y generated by taking the sum, by means of an activating function f sgn(B).

The binarized neural network circuit 100 is a binarized CNN which does not require a bias value illustrated in Formula 6.

The binarized neural network circuit 100 is applied to the hidden layer 12 in the deep neural network 1 (see FIG. 1). Explanation herein is based on an assumption that in the deep neural network 1, an input value is subjected to evaluation such that the input value has already been subjected to learning.

In a network, objects recognized by a client have respective different weights. Weights may be different each time after different learnings. Meanwhile, in image processing, the same coefficient is used any time. In this regard, hardware in the network and in the image processing is significantly different from each other.

The XNOR gate circuit 102 may be any logic circuit part as long as the circuit 102 includes exclusive OR. That is, the XNOR gate circuit 102 is not limited to an XNOR gate and may be any gate circuit as long as the gate circuit takes logic of input values x1-xn and weights w1-wn. For example, a combination of an XOR gate and a NOT gate, a combination of an AND gate and an OR gate, a gate circuit manufactured by using a transistor switch, or any other logically equivalent gate circuit may be used.

The binarized neural network circuit 100 herein is a binarized neural network which does not require a bias, from which the bias b input part 32, which is necessary in the binarized neural network circuit 40 (see FIG. 6) in the comparative example, is deleted.

The sum circuit 103 thus takes only a sum of XNOR logical values. In other words, the sum circuit 103 does not take a sum of the XNOR logical values and a bias b, unlike the sum circuit 34 in the binarized neural network circuit 40 (see FIG. 6) as the comparative example.

The batch normalization circuit 41 includes: the subtractor 42 configured to subtract a difference between a signal Y generated by using a weighted sum, and an average value ($\mu_B$); the first multiplier circuit 43 configured to multiply the outputted value obtained from the subtractor 42, a variance value ($\sigma^2_B$) of a minibatch, and a constant ($\epsilon$); the second multiplier circuit 44 configured to normalize the outputted value obtained from the first multiplier circuit 43, using a scaling ($\gamma$) value (multibit); and the adder 45 configured to, after the normalization using the scaling coefficient ($\gamma$), make a shift based on a shift value ($\beta$) (multibit) and then perform grouping into two.

The activation circuit 35 is a circuit simulating an activating function circuit which outputs only a sign bit of a signal Y generated by taking a sum. The sign bit is a binary signal indicating either that the multibit signal Y having taken the sum be activated or not.

As described above, in the binarized neural network circuit 100, the sum circuit 103 takes only a sum of the XNOR logical values as expressed in Formula (6). The binarized neural network circuit 100 does not thus require a bias.

Next is described how the binarized neural network circuit 100 having the structure as described above works.

The binarized neural network circuit 100 is used in the neural network circuit 2 in the deep neural network 1 illustrated in FIG. 1. In this case, the input nodes x1-xn in the binarized neural network circuit 100 correspond to input nodes in the hidden layer1 in the deep neural network 1 illustrated in FIG. 1. The input part 101 is configured to allow input of the input values x1-xn (binary) of the input nodes in hidden layer1 of the hidden layer 12, and the weights w1-wn (binary).

The XNOR gate circuit 102 as a substitute for multiplication receives the input values x1-xn and the weights w1-wn, and performs a binary (−1/+1) multiplication by means of XNOR logic. After passing through the XNOR gate circuit 102, the sum circuit 103 takes a sum of XNOR logical values. The batch normalization circuit 41 batch-normalizes a signal Y generated by the sum. The activating function circuit 35 converts a signal B obtained by batch-normalizing the signal Y generated by the sum, by means of an activating function $f_{sgn}(B)$.

In the binarized neural network circuit 100, the multiplier circuit 21 having a multibit structure (see FIG. 2) in the comparative example is replaced by the XNOR gate circuit 102 which realizes XNOR logic. This makes it possible to reduce an area required for constituting the multiplier circuit 21. Additionally, a memory capacity can be significantly reduced and a memory bandwidth can be improved because both the input values x1-xn and the weights w1-wn are binary (−1/+1), compared to being multibit (multiple valued).

Example of Learning

In order to confirm advantageous effects of this embodiment, a VGG11 benchmark network (having 11 hidden layers) is implemented and whether or not learning is successfully completed is checked. The VGG11 is a benchmark widely used and is reproducible.

Figure 10A:
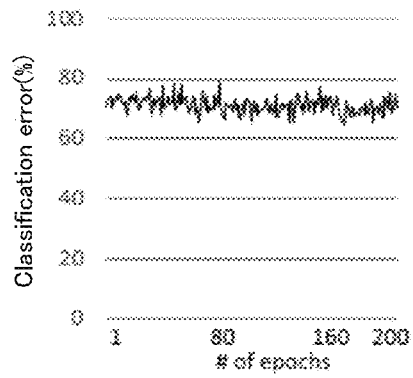
FIG. 10A is a diagram explaining recognition accuracy of the deep neural network circuit structured "without batch normalization" according to the embodiment.
Figure 10B:
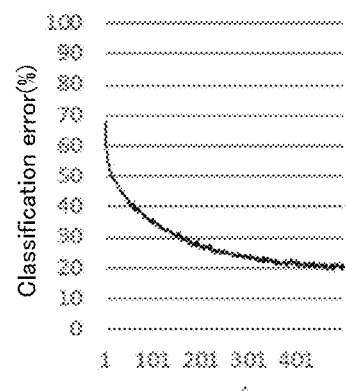
FIG. 10B is a diagram explaining recognition accuracy of the deep neural network circuit structured "with batch normalization" (with a bias term) according to the embodiment.

FIG. 10A to FIG. 10O are each a diagram explaining recognition accuracy of results of learning image recognition tasks on CIFAR10, using respective binarized VGG11 models of the comparative example and this embodiment. FIG. 10A illustrates recognition accuracy of the neural network circuit 30 (see FIG. 4) structured "without batch normalization" (with a bias term). FIG. 10B illustrates recognition accuracy of the binarized neural network circuit 40 (see FIG. 6) structured "with batch normalization" (with a bias term). FIG. 10O illustrates recognition accuracy of the binarized neural network circuit 100 (see FIG. 9) structured "with batch normalization" (without a bias term) according to this embodiment. FIG. 10O illustrates the result obtained by implementing and checking this embodiment by the VGG11 benchmark network.

In each of FIG. 10A to FIG. 10O, the abscissa denotes the number of epochs which is the number of cycles having already been updated with respect to training data used (the number of times of learning), and the ordinate denotes a false recognition rate (classification error). In FIG. 10A to FIG. 10O, a float 32 accuracy CNN of a framework software Chainer (registered trademark) for deep neural network is used.

Effects of Batch Normalization

As illustrated in FIG. 10A as the case "without batch normalization", the simply-binarized neural network circuit 30 (see FIG. 4) in the comparative example is high in the false recognition rate (the number of epochs, 200 or more; and the false recognition rate, approximately 70%) and is poor in the recognition accuracy. Additionally, even when learning is continued, little improvement of the recognition accuracy is observed (the learning has not been successful).

By contrast, it is confirmed that each of the binarized neural network circuit 40 (see FIG. 6) structured "with batch normalization" (with a bias term) according to comparative example shown in FIG. 10B and the binarized neural network circuit 100 (see FIG. 9) structured "with batch normalization" (without a bias term) according to comparative example shown in FIG. 10O has a false recognition rate decreased as the learning proceeds, with each of the number of epochs of 400 or more and a lower false recognition rate (approximately 20%). This shows that the learning is successful.

As described above, the learning is not successful without using the batch normalization circuit 41. It is confirmed again that the batch normalization circuit 41 is required in the binarized neural network circuit 30.

Figure 10C:
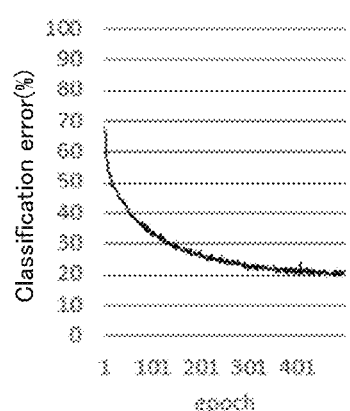
FIG. 10C is a diagram explaining recognition accuracy of the deep neural network circuit structured "with batch normalization" (without a bias term) according to the embodiment.

Advantageous Effects of Binarized CNN Batch Normalization Which Eliminates Need for Bias Term As will be understood by the comparison between the case "with batch normalization" (with a bias term) of the comparative example shown in FIG. 10B and the case "with batch normalization" (without a bias term) of this embodiment shown in FIG. 10C, it is confirmed that, if the batch normalization circuit 41 is used, whether or not a bias term is used exerts little influence on recognition accuracy.

That is, it is confirmed that the neural network circuit 100 (see FIG. 9) structured "with batch normalization" (without a bias term) shown in FIG. 10C according to this embodiment has a good recognition accuracy even without a bias term, compared to the neural network circuit 40 structured "with batch normalization" (with a bias term) shown in FIG. 10B according to the comparative example.

FIG. 11 is a table showing results of the binarized neural network circuit 100 according to this embodiment when implemented in FPGA (NetFPGA-1G-CML, manufactured by Digilent Inc.) in comparison with existing multibit implementing techniques.

The table of FIG. 11 shows comparative results of various items when respective neural networks according to the conference presenters, [Zhao et al.] and [FINN] with respective paper published years detailed in the margin below the table, and the neural network according to this embodiment, are realized in FPGA (Digilent Inc., ZedBoard).

Terms used in FIG. 11 are as follows.

"Implementation" is a name of an implemented technique or a study group.

"(Year)" is a year in which a relevant literature is published.

"FPGA Board" is a name of a board mounting an FPGA (a field-programmable gate array).

"(FPGA)" is a model number of the FPGA mounted on the FPGA mounting board. The same FPGAs are used herein for comparison under identical conditions.

"Clock [MHz]" is an operating frequency of the FPGA. The higher the operating frequency, the higher a speed of operation.

"# LUTs" is a LUT (Look-Up Table) consumption of the FPGA and represents an area.

"#18 Kb BRAMs" is a consumption of an internal memory block of the FPGA and represents an area.

"# DSP Blocks" is a consumption of an internal multiply-accumulate block of the FPGA and represents an area.

"Test Error" is an error rate of a test image and represents recognition accuracy.

"Time [msec]" is a recognition time (in milliseconds).

"(FPS)" is an abbreviation of Frames Per Second and is the number of images recognizable per unit time. The larger the number of the FPS, the higher the speed.

"Power [W]" is a power consumption (in Watts).

"FPS/Watt" is a power consumption efficiency.

"FPS/LUT" is an area efficiency.

"FPS/BRAM" is a memory capacity efficiency.

In the table of FIG. 11, the following terms are presented for comparison: "Platform" (a platform); "FPGA Board" (an FPGA Board used); "Clock (MHz)" (an internal clock for synchronization); "LUT, BRAM, DSP Block" (a memory and the number of DSPs); "Test Error" (a false recognition rate); "Time (msec) (FPS)" (a processing time (a throughput speed)); "Power (W)" (power consumption); and "FPS/Watt, FPS/LUT, FPS/BRAM" (a data transfer wait time/a transfer rate when a memory is externally provided). In the table, the items to be specifically focused on are described below.

Power Consumption

Compared with the conventional examples in the table, it is demonstrated that the binarized neural network circuit 100 according to this embodiment is well-balanced with respect to power. In the conventional examples, as shown in "Power (W)", power consumption is as large as 4.7 W and 2.5 W. Such large power consumption makes a control method for its reduction complicated. As shown in "Power (W)", this embodiment can reduce the power consumption to 2.3 W, which is one half, compared with that of the conventional example [Zhao et al.].

Chip Area

The binarized neural network circuit 100 according to this embodiment has advantageous effects such that: a chip area is reduced to about one third, namely from 46,900 to 14,509, as shown in "LUTs, BRAMs, and DSP Blocks" of the table; an externally-provided memory becomes unnecessary; a memory controller becomes simple; and the like. This is because a bias is not required and a multiplier circuit is a binarized logic gate. Since the chip area is proportionate to a price, a decrease in the price by about two digits can be expected.

Performance Equivalence

The binarized neural network circuit 100 according to this embodiment has a performance power efficiency which is increased to approximately fivefold from 35.7 Watt to 182.6 Watt, as shown in "FPS/Watt, FPS/LUT, and FPS/BRAM" in the table, even not with respect to the area but the power efficiency alone. Also, the data transfer rate is approximately tripled from 168 fps to 420 fps.

Examples of Implementation

Figure 12:
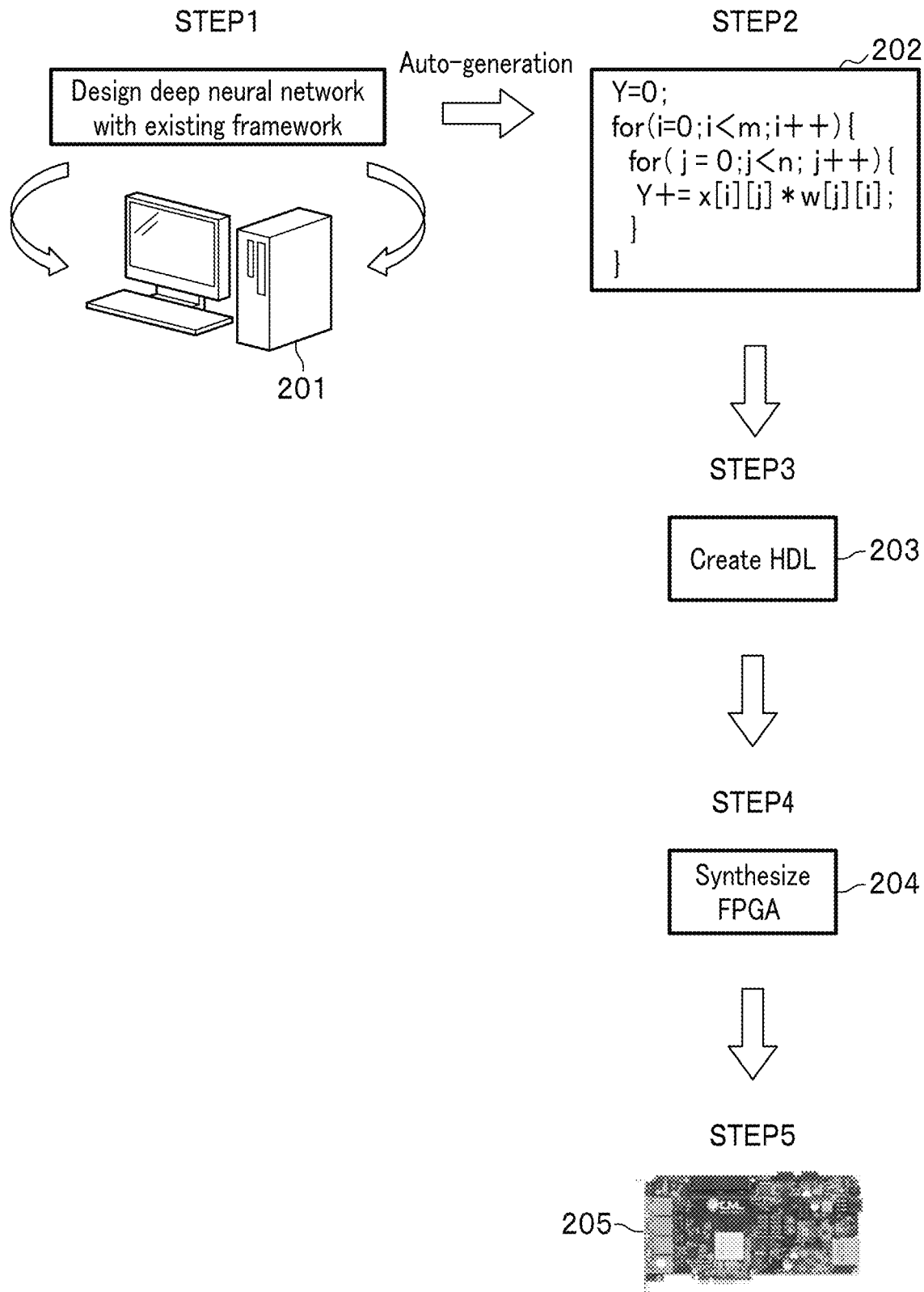
FIG. 12 is a diagram explaining an example of implementing the binarized neural network circuit in the deep neural network according to the embodiment.

FIG. 12 is a diagram explaining an example of implementing a binarized neural network circuit according to the embodiment of the present invention.

Step 1

A given dataset (ImageNet which is data for image recognition tasks) is trained on a computer 201 having a GPU (Graphics Processing Unit), using Chainer (registered trademark) which is existing framework software for deep neural network. Learning is conducted in the GPU. The computer 201 includes: a CPU (Central Processing Unit) such as an ARM processor; a memory; a storage unit (a storage part) such as a hard disk; and an I/O port including a network interface. The CPU of the computer 201 executes a program loaded in the memory (a program of executing a binarized neural network), to thereby make a control part (a control unit) composed of processing units to be described later operate.

Step 2

A C++ code equivalent to the binarized neural network circuit 100 according to this embodiment is automatically generated by using an auto-generation tool, to thereby obtain a C++ code 202.

Step 3

HDL (hardware description language) 203 is created for synthesizing a FPGA (field-programmable gate array), using a high level synthesis tool by a FPGA vendor (SDSoC manufactured by Xilinx, Inc.) (registered trademark). For example, in the high level synthesis tool (SDSoC developed by Xilinx Inc.), a logic circuit desired to be realized is described using a hardware description language (Verilog HDL/VHDL), which is then synthesized into a bitstream using a CAD tool provided. The bitstream is transmitted to the FPGA, to thereby realize the desired circuit in the FPGA.

Step 4

The binarized neural network circuit 100 is then realized in the FPGA (FPGA synthesis 204), and image recognition is verified using a conventional FPGA synthesis tool, Vivado (registered trademark).

Step 5

After verification, a board 205 is completed. The binarized neural network circuit 100 is converted into hardware and is implemented on the board 205.

As described above, the binarized neural network circuit 100 according to this embodiment (see FIG. 9) includes: the input part 101 configured to allow input of an input node which allows input of input values x1-xn (xi) (binary), and weights w1-wn (wi) (binary); the XNOR gate circuit 102 configured to receive the input values x1-xn and the weights w1-wn and take XNOR logic; the sum circuit 103 configured to take a total sum of each of XNOR logical values; the batch normalization circuit 41 configured to correct a variance due to binarization, by extending a range of normalization and shifting a center thereof; and the activating function circuit 35 configured to convert a signal B obtained by batch-normalizing a signal Y generated by taking the sum, by means of an activating function f sgn(B). The signal Y generated by taking the sum is expressed in Formula (6).

The neural network processing method of the present invention performs: a step of allowing input of input values x1-xn (xi) (binary) and weights w1-wn (xi) (binary); a step of receiving the input values x1-xn and the weights w1-wn and to take XNOR logic; a step of summing only the XNOR logical values as expressed in Formula (6); a step of conducting batch normalization; and a step of converting a signal B obtained by batch-normalizing a signal Y generated by taking the sum, by means of an activating function f sgn(B).

In the neural network processing method, learning is performed using a binarized CNN which does not require a bias term at learning time. A bias term is not necessary also when a circuit is realized.

This makes it possible to eliminate need for a memory or an adder circuit for holding a bias term and to realize a CNN with a binary input, a weight, and the batch normalization circuit 41. Thus, a CNN having good performance in area, power consumption, and speed can be realized with little decrease in recognition accuracy.

For example, as shown in the table of FIG. 11, the binarized neural network circuit 100 according to this embodiment can reduce the power consumption (Power [W]) to half and the area to about one thirtieth (in synergy with FPS/Watt, FPS/LUT, and FPS/BRAM).

This embodiment excludes need for a bias itself, which is indispensable for the binarized neural network circuit 40

(see FIG. 6), and thus allows the area and a memory size to be reduced. Further, as will be understood by comparing FIG. 10B to FIG. 10C, the binarized neural network circuit 100 according to this embodiment has very little difference therebetween in recognition accuracy.

FIG. 13 is a diagram illustrating amounts of hardware in different FPGA implementations for comparison. The amounts of hardware required for fixed point accuracy, binarization, and this embodiment, are calculated, using FPGAs developed by Xilinx, Inc. More specifically, TensorFlow tutorial CNN is implemented, which is implemented on a NetFPGA-1G-CML board developed by Digilent Inc.

Those FPGA implementations are compared only among this embodiment (binarization (batch normalization+without bias)), the fixed point (16-bit) in the comparative example, and binarization (bias only) in the comparative example. The amount of FPGA implementing hardware is indicated by the number of FFs (flip-flops), the number of LUTs, the number of 18 Kb BRAMs, and the number of DSPs (digital signal processors) 48E.

As shown in FIG. 13, it is demonstrated that, compared with a case of the fixed point accuracy, both cases of this embodiment (binarization (batch normalization+without bias)) and binarization (bias only) have each a decreased amount of hardware with respect to any of the number of FFs, the number of LUTs, the number of 18 Kb BRAMs, and the number of DSPs 48E. It is also shown that the case of this embodiment (binarization (batch normalization+without bias)) has the amount of hardware (area) larger than that of the binarization (bias only) by only as small as about 1 to 2%.

Further advantageous effects of this embodiment are described below.

(1) Comparison with CNN Without Batch Normalization

This embodiment has, compared to a CNN without batch normalization, advantageous effects that neither a bias term circuit nor a bias at learning time is necessary, and thus, learning becomes easier. This embodiment requires, however, a circuit for batch normalization. As will be seen in FIG. 13 in which the cases of this embodiment (binarization (batch normalization+without bias)) and the binarization (bias only) in the comparative example are compared to each other, this embodiment has an increased amount of both hardware (area) and power by several percentage points.

(2) Comparison at Learning Time

As shown in FIG. 10B and FIG. 10C, there is little difference found between the recognition accuracy of the binarized neural network circuit 100 according to this embodiment (see FIG. 10C) and the recognition accuracy of the binarized neural network circuit 40 structured "with batch normalization" (with a bias term) according to the comparative example (see FIG. 10B) with respect to learning time. In FIG. 13, differences therebetween when the respective circuits are realized are also shown.

(3) Circuit Designing

When a bias value is present, circuit designing should take into account that the bias value is very small (a fixed point of 30 to 40 bits).

In this embodiment, it is demonstrated that, as shown in FIG. 10A to FIG. 10C, a CNN substantially equivalent in recognition accuracy can be structured, while at the same time, the power consumption can be reduced by half and the area can be reduced to about one thirtieth (see FIG. 11), compared to a binarized neural network circuit having an existing bias. The network circuit 100 is expected to be put to practical use as an edge assembly apparatus hardware system for ADAS (Advanced Driver Assistance System) camera image recognition using deep learning. The ADAS particularly requires high reliability and low heat generation for automobile use. In the binarized neural network circuit 100 according to this embodiment, power consumption (Power [W]) is significantly reduced as shown in the table of FIG. 11, and, additionally, an external memory is not necessary. This eliminates need for a cooling fan or a cooling fin for cooling such a memory, thus allowing the binarized neural network circuit 100 to be suitably mounted on an ADAS camera.

Variations

Figure 14:
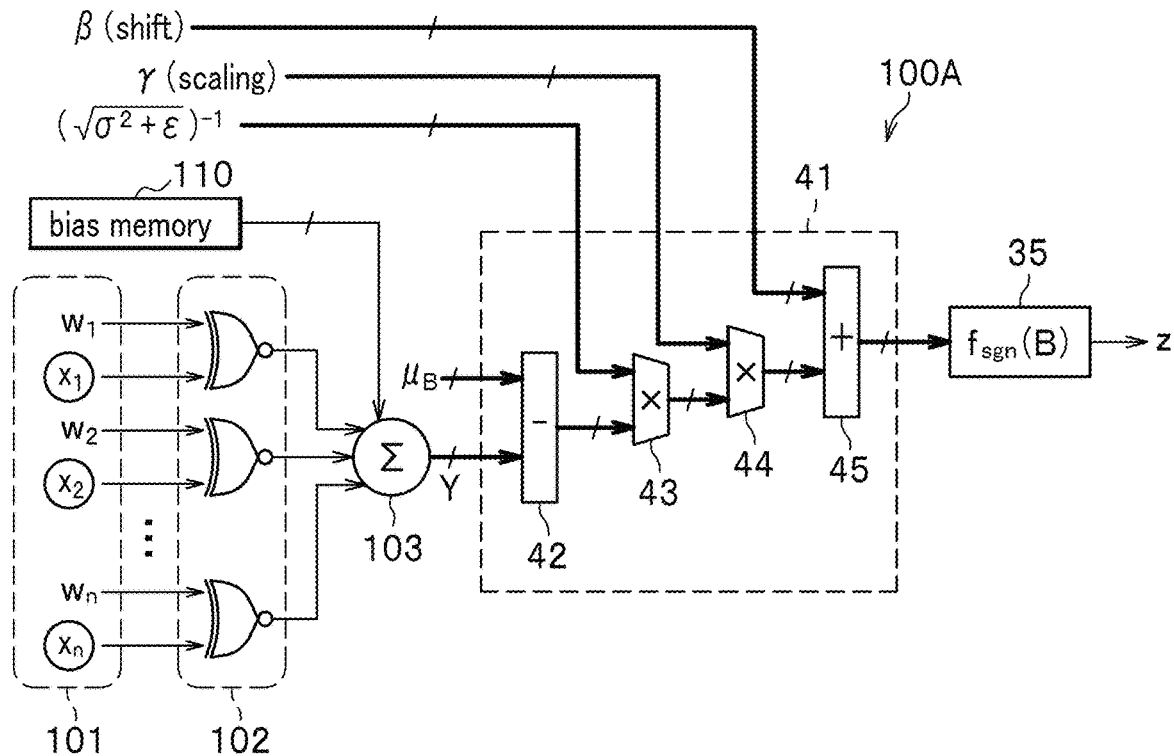
FIG. 14 is a diagram illustrating a structure of a binarized neural network circuit in a deep neural network according to Variation 1.

FIG. 14 is a diagram illustrating a structure of a binarized neural network circuit in a deep neural network according to Variation 1. In FIG. 14, same reference numerals are given to components same as those in FIG. 9, and a duplicate description of those components will be omitted herein.

A binarized neural network circuit 100A according to Variation 1 can be applied to the neural network circuit 2 of FIG. 1.

The binarized neural network circuit 100A (which may also be referred to as a neural network circuit device) is a binarized neural network circuit which does not require a bias.

As illustrated in FIG. 14, the binarized neural network circuit 100A includes, in addition to the binarized neural network circuit 100 of FIG. 9, a bias memory 110 (a storage part or a bias value input part) configured to store therein a bias value.

The binarized neural network circuit 100A reads a bias value stored in the bias memory 110 and outputs the read bias value to a sum circuit 103. In this case, similarly to the binarized neural network circuit 40 (see FIG. 6) in which a bias is used, the binarized neural network circuit 100A is configured such that a bias value is inputted into the sum circuit 103. The sum circuit 103 is herein configured to take a sum of each of XNOR logical values in the XNOR gate circuits 102 and a bias value. That is, the binarized neural network circuit 100A can realize a neural network processing method equivalent to the binarized neural network circuit 40 (see FIG. 6) in which a bias is used.

Further, the binarized neural network circuit 100A can realize a neural network processing method of the binarized neural network circuit 100A in which a circuit expressed by Formula (6) is performed, by writing "0" in the sum circuit 103, in place of reading a bias value stored in the bias memory 110. In this case, the binarized neural network circuit 100A serves as a binarized CNN which does not require a bias.

In Variation 1, the binarized neural network circuit 100A can be used as a substitute for the existing binarized neural network circuit 40 (see FIG. 6) in which a bias is used and is thus applicable to general purpose. In particular, it is advantageous that the binarized neural network circuit 100A is applicable without performing design change or verification of the existing bias-using binarized neural network circuit 40 itself, or a memory or a read-write controller connected to the existing bias-using binarized neural network circuit 40. Resources accumulated associated with the existing binarized neural network circuit 40 can also be utilized.

Figure 15:
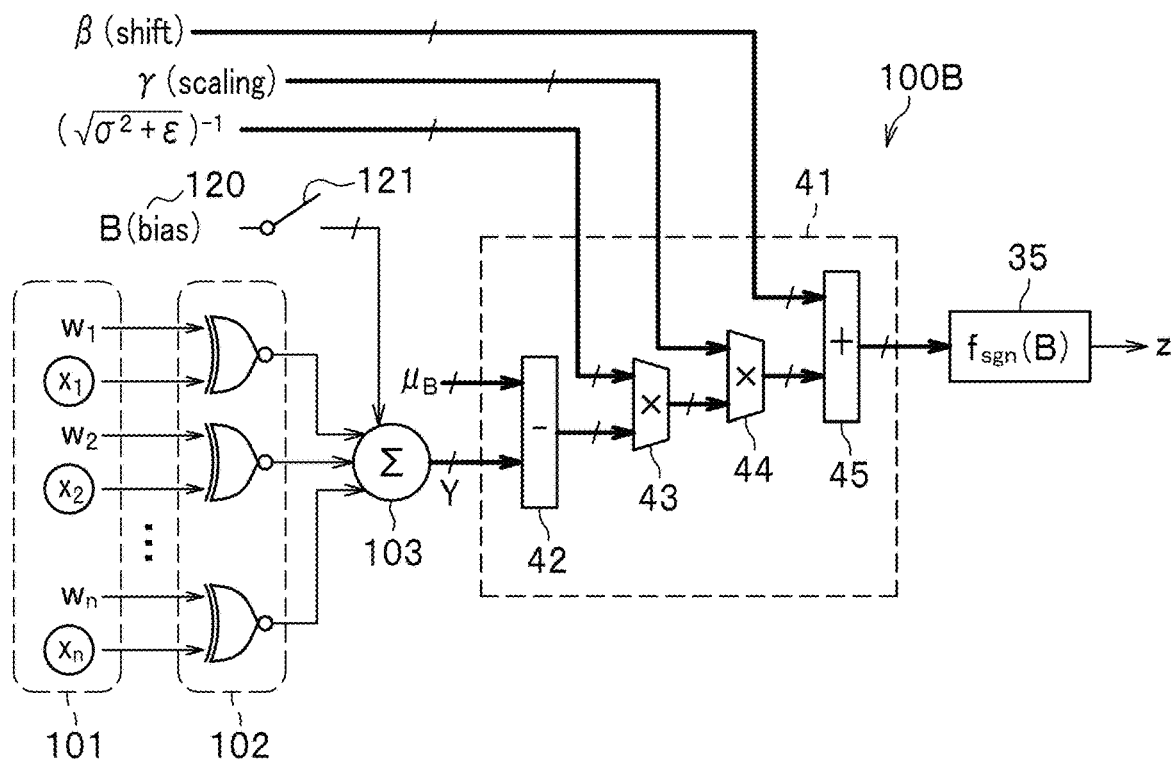
FIG. 15 is a diagram illustrating a structure of a binarized neural network circuit in a deep neural network according to Variation 2.

FIG. 15 is a diagram illustrating a structure of a binarized neural network circuit according to Variation 2. In FIG. 15, same reference numerals are given to components same as those in FIG. 9, and a duplicate description of those components will be omitted herein.

A binarized neural network circuit 100B according to Variation 2 can be applied to the neural network circuit 2 of FIG. 1.

The binarized neural network circuit 100B (which may also be referred to as a neural network circuit device) is a binarized neural network circuit which does not require a bias.

As illustrated in FIG. 15, the binarized neural network circuit 100B includes, in addition to the binarized neural network circuit 100 of FIG. 9, a bias value input part 120 configured to allow input of a bias value B; and a switch 121 configured to turn on or off input of the bias value B into the sum circuit 103.

The binarized neural network circuit 100B reads a bias value stored in the bias memory 110 and outputs the read bias value to the sum circuit 103. In this case, similarly to the binarized neural network circuit 40 (see FIG. 6) in which a bias is used, the binarized neural network circuit 100B is configured such that a bias value B is inputted into the sum circuit 103. The sum circuit 103 is herein configured to take a sum of each of XNOR logical values in the XNOR gate circuits 102 and a bias value. That is, the binarized neural network circuit 100B can realize a neural network processing method equivalent to the binarized neural network circuit 40 (see FIG. 6) in which a bias is used.

Further, the binarized neural network circuit 100B can realize a neural network processing method of the binarized neural network circuit 100A in which a circuit expressed by Formula (6) is performed, by turning off the switch 121 to thereby turn off input of the bias value B into the sum circuit 103.

In Variation 2, the binarized neural network circuit 100B can be used as a substitute for the existing binarized neural network circuit 40 (see FIG. 6) in which a bias is used and can have advantageous effects same as those of Variation 1. Variation 2 has a structure simpler than that of the binarized neural network circuit 100A according to Variation 1 and is thus more applicable to general purpose.

The present invention is not limited to the above-described embodiments, and other variations and modifications include as long as within a scope not departing from the gist of the present invention described in claims.

For example, in place of a logic gate as a multiplier circuit, a LUT (Look-Up Table) may be used. The LUT uses, in place of the XNOR gate circuit 102 (see FIG. 9) which performs XNOR logic, a look-up table as a basic basic component of FPGA is used. The LUT stores therein a binary (−1/+1) XNOR logic result Y in response to a 2-input (x1, w1). Usage of the LUT can make it unnecessary to provide a memory area and a memory bandwidth for storing an area and a parameter for a batch normalization circuit and can also realize a circuit structure having equivalent performance. As described above, the LUT is a basic component of the FPGA, and thus, the LUT has a high compatibility in FPGA synthesis and can be easily implemented by the FPGA.

The above-detailed embodiments are intended to be illustrative of the present invention in an easily understandable manner and the present invention is not limited to that includes all of the components explained in the embodiments. Part of a structure of an embodiment can be substituted by or added to that of another embodiment. An exemplary embodiment can be carried out in other various embodiments, and various omissions, substitutions, and changes are possible within a scope not departing from the gist of the present invention. Those embodiments and variations are included in claims or abstract and are also included in the inventions described in claims as well as within a range equivalent to those claims.

Among each of the processings explained in the embodiment, all or part of the processing explained as being performed automatically can be performed manually instead. Or, all or part of the processing explained as being performed manually can be performed automatically by a known method. Information including a processing procedure, a control procedure, a specific name, and various types of data and parameters illustrated in the specification or in the drawings can be optionally changed, unless otherwise specified.

The constituent elements of the devices illustrated in the drawings are functionally conceptual and are not necessarily structured as physically illustrated. That is, a specific configuration of distribution and integration of the devices is not limited to those as illustrated, and all or part thereof can be structured by functionally or physically distributing or integrating in any appropriate unit, depending on various types of load and status of usage.

Part or all of a configuration, a function, a processing part, a processing unit, or the like described above can be realized by hardware by means of, for example, designing using an integrated circuit. The aforementioned configuration, function, or the like can be embodied by software in which a processor interprets and executes a program which realizes the function. Information such as a program, a table, a file, and the like for realizing such a function can be stored in a storage device including a memory, a hard disk, and a SSD (Solid State Drive) or in a storage medium including an IC (Integrated Circuit) card, a SD (Secure Digital) card, and an optical disc.

In the above-described embodiments, the device is named as a neural network circuit device. The name is, however, used for purpose of illustration and may be a deep neural network circuit, a neural network device, a perceptron, or the like. In the above-described embodiments, the method and the program are named as the neural network processing method. The name may be instead a neural network computing method, a neural net program, or the like.

DESCRIPTION OF REFERENCE NUMERALS 1 deep neural network
2 neural network circuit
11 input layer
12 hidden layer (intermediate layer)
13 output layer
35 activating function circuit (activating circuit part, activating circuit unit)
41 batch normalization circuit
42 subtractor
43 first multiplier circuit
44 second multiplier circuit
45 adder
100, 100A, 100B binarized neural network circuit (neural network circuit device)
101 input part
102 XNOR gate circuit (logic circuit part, logic circuit unit)
103 sum circuit (sum circuit part, sum circuit unit)
110 bias memory (storage part, bias value input part)
120 bias value input part
121 switch
x1-xn (xi) input value (binary)
w1-wn (wi) weight (binary)

The invention claimed is:

1. A neural network circuit device including at least an input layer, one or more intermediate layers, and an output layer, the neural network circuit device comprising:
  a logic circuit part configured to receive, in the one or more intermediate layers, a binary input value $x_i$ and a weight $w_i$ and perform a logical operation, the logic circuit part comprising XNOR gate circuits in place of a multiplier circuit and performing binarization;
  a sum circuit part configured to receive a sum of XNOR logical values produced by the XNOR gate circuit;
  a batch normalization circuit part configured to correct a variance due to the binarization, by performing a processing of extending a normalization range and shifting a center of the range; and
  an activation circuit part configured to convert a signal B obtained by batch-normalizing a signal Y generated by taking the sum by means of an activating function f sgn(B),
  wherein the signal Y generated by taking the sum is expressed by the following formula:

[Formula 6]

$$Y = \sum_{i=1}^{n} w_i x_i + \left( \mu'_B + \frac{\sqrt{\sigma_B^2 + \in}}{\gamma} \beta \right) \quad (6)$$

where
$\gamma$: a scaling coefficient
$\beta$: a shift value
$\mu_B$: an average value excluding a bias; given that a bias value when an input value is $x_0$ is denoted by $w_0$, and an average value of minibatches is denoted by $\mu_B$, then "$w_0 - \mu_B$"
$\sigma_B^2$: a variance value of minibatches
$\in$: a constant.

2. The neural network circuit device according to claim 1, wherein, when the signal Y generated by taking the sum is expressed by Formula 4:

{Formula 4]

$$Y = \sum_{i=1}^{n} w_i x_i - \mu'_B + \frac{\sqrt{\sigma_B^2 + \in}}{\gamma} \beta \quad (4)$$

where
$\mu_B$: an average value of minibatches,
based on a bias value $w_0$ when "input value" $x_0=1$, Formula (4) described above is arranged into Formula (5):

[Formula 5]

$$Y = \sum_{i=1}^{n} w_i x_i + \left( w_0 - \mu_B + \frac{\sqrt{\sigma_B^2 + \in}}{\gamma} \beta \right) \quad (5)$$

and, by substituting $\mu'_B$ which is a value obtained by subtracting the average value of minibatches $\mu_B$ from the bias value $w_0$, Formula (5) is arranged into Formula (6) as follows:

[Formula 6]

$$Y = \sum_{i=1}^{n} w_i x_i + \left( \mu'_B + \frac{\sqrt{\sigma_B^2 + \in}}{\gamma} \beta \right) \quad (6)$$

3. A neural network including the neural network circuit device according to claim 2.

4. The neural network circuit device according to claim 1, further comprising a bias value input part configured to allow input of a bias value,
  wherein the sum circuit part takes a sum of the output from the logic circuit part and the bias value.

5. The neural network circuit device according to claim 4, further comprising a storage part configured to store therein a bias value,
  wherein the bias value input part is configured to read a bias value stored in the storage part and output the read bias value, and, when the bias is not used, write "0" in the sum circuit part and perform a circuit expressed by Formula 6 as follows:

[Formula 6]

$$Y = \sum_{i=1}^{n} w_i x_i + \left( \mu'_B + \frac{\sqrt{\sigma_B^2 + \in}}{\gamma} \beta \right) \quad (6)$$

6. A neural network including the neural network circuit device according to claim 5.

7. The neural network circuit device according to claim 4, further comprising a switch configured to turn on or off input of the bias value into the sum circuit,
  wherein, when the bias value is not used, the switch is turned off and a circuit expressed by Formula (6) as follows is performed:

[Formula 6]

$$Y = \sum_{i=1}^{n} w_i x_i + \left( \mu'_B + \frac{\sqrt{\sigma_B^2 + \in}}{\gamma} \beta \right) \quad (6)$$

8. A neural network including the neural network circuit device according to claim 7.

9. A neural network including the neural network circuit device according to claim 4.

10. The neural network circuit device according to claim 1, wherein the logic circuit part includes an XNOR or an XOR.

11. A neural network including the neural network circuit device according to claim 10.

12. A neural network including the neural network circuit device according to claim 1.

13. A neural network circuit method in a neural network circuit device including at least an input layer, one or more intermediate layers, and an output layer, the neural network circuit method comprising:
  a step of, in the one or more intermediate layers, receiving a binary input value $x_i$ and a weight $w_i$ and performing a logical operation comprising XNOR operations in place of multiplier operations, the logical operation performing binarization;

a step of taking a sum of XNOR logical values produced by the XNOR operations;

a step of correcting a variance due to the binarization, by extending a normalization range and shifting a center of the range; and a step of converting a signal B obtained by batch-normalizing a signal Y generated by taking the sum by means of an activating function f sgn(B), wherein the signal Y generated by taking the sum is expressed by the following formula:

[Formula 6]

$$Y = \sum_{i=1}^{n} w_i x_i + \left( \mu'_B + \frac{\sqrt{\sigma_B^2 + \in}}{\gamma} \beta \right) \quad (6)$$

where $\gamma$: a scaling coefficient $\beta$: a shift value $\mu_B$: an average value excluding a bias; given that a bias value when an input value is $x_0$ is denoted by $w_0$, and an average value of minibatches is denoted by $\mu_B$, then "$w_0\text{-}\mu_B$"

$\sigma^2_B$: a variance value of minibatches $\in$: a constant.

14. A neural network execution program embodied on a non-transitory computer-readable storage medium, the program for causing a computer serving as a neural network circuit device including at least an input layer, one or more intermediate layers, and an output layer, the neural network execution program comprising:

a logic circuit unit configured to receive, in the one or more intermediate layers, a binary input value $x_i$ and a weight $w_i$ and perform a logical operation, the logic circuit unit comprising XNOR gate circuits in place of a multiplier circuit and performing binarization;

a sum circuit unit configured to receive a sum of XNOR logical values produced by the XNOR gate circuits;

a batch normalization circuit unit configured to correct a variance due to the binarization, by performing a processing of extending a normalization range and shifting a center of the range; and an activation circuit unit configured to convert a signal B obtained by batch-normalizing a signal Y generated by taking the sum by means of an activating function f sgn(B), wherein the signal Y generated by taking the sum is expressed by the following formula:

[Formula 6]

$$Y = \sum_{i=1}^{n} w_i x_i + \left( \mu'_B + \frac{\sqrt{\sigma_B^2 + \in}}{\gamma} \beta \right) \quad (6)$$

where $\gamma$: a scaling coefficient $\beta$: a shift value $\mu_B$: an average value excluding a bias; given that a bias value when an input value is $x_0$ is denoted by $w_0$, and an average value of minibatches is denoted by $\mu_B$, then "$w_0\text{-}\mu_B$"

$\sigma^{-2}_B$: a variance value of minibatches $\in$: a constant.

* * * * *